(12) United States Patent
Mock et al.

(10) Patent No.: US 11,173,781 B2
(45) Date of Patent: Nov. 16, 2021

(54) COMPONENT ALIGNMENT FOR A MULTIPLE MOTOR MIXED-SPEED CONTINUOUS POWER TRANSMISSION

(71) Applicant: Allison Transmission, Inc., Indianapolis, IN (US)

(72) Inventors: Isaac Mock, Martinsville, IN (US); James Allen Raszkowski, Indianapolis, IN (US); Jeremy Turner, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 15/929,194

(22) Filed: Dec. 20, 2019

(65) Prior Publication Data

US 2021/0188075 A1 Jun. 24, 2021

(51) Int. Cl.
*H02K 7/14* (2006.01)
*B60K 6/445* (2007.10)
*B60W 10/08* (2006.01)
*B60W 10/115* (2012.01)
*B60K 6/54* (2007.10)
*B60W 20/10* (2016.01)

(52) U.S. Cl.
CPC ............... *B60K 6/445* (2013.01); *B60K 6/54* (2013.01); *B60W 10/08* (2013.01); *B60W 10/115* (2013.01); *B60W 20/10* (2013.01)

(58) Field of Classification Search
CPC .... B60K 6/387; B60K 1/02; B60K 2025/005; H02K 7/006
See application file for complete search history.

(56) References Cited

U.S. PATENT DOCUMENTS

| 5,289,890 A | 3/1994 | Toyoda et al. |
| 5,793,600 A | 8/1998 | Fukuda et al. |
| 5,931,757 A | 8/1999 | Schmidt |
| 7,139,654 B2 | 11/2006 | Fidlin et al. |

(Continued)

FOREIGN PATENT DOCUMENTS

| DE | 10235257 A1 | 2/2003 |
| EP | 2449286 B1 | 3/2013 |

(Continued)

OTHER PUBLICATIONS

PCT, Intl. App. No. PCT/US2020/070940 International Search Report, 4 pages, dated Mar. 30, 2021.

(Continued)

*Primary Examiner* — Karen Masih
(74) *Attorney, Agent, or Firm* — Woodard, Emhardt, Henry, Reeves & Wagner, LLP

(57) ABSTRACT

An electric powertrain includes a first electric motor that has an uninterrupted connection with a drive shaft of a vehicle. The electric powertrain further includes a second electric motor that has an interruptible connection with the drive shaft. In one form, this interruptible connection includes a clutch. The electric powertrain further includes a first gear train in the form of a first planetary gear and a second gear train in the form of a second planetary gear. To provide a compact configuration, the first electric motor and second electric motor are arranged in a longitudinal orientation with the drive shaft.

24 Claims, 11 Drawing Sheets

(56) References Cited

U.S. PATENT DOCUMENTS

| | | |
|---|---|---|
| 7,325,291 B2 | 2/2008 | Ahnert |
| 7,935,015 B2 | 5/2011 | Tabata et al. |
| 8,196,687 B2 | 6/2012 | Swales et al. |
| 8,454,473 B2 | 6/2013 | Reitz |
| 9,120,480 B2 | 9/2015 | Kiuchi |
| 9,421,856 B2 | 8/2016 | Frank et al. |
| 9,457,658 B2 | 10/2016 | Knoblauch |
| 9,463,698 B2 | 10/2016 | Severinsky et al. |
| 9,566,852 B2 | 2/2017 | Knoblauch et al. |
| 10,144,309 B2 | 12/2018 | Leng et al. |
| 10,183,570 B2 | 1/2019 | Kimes et al. |
| 10,220,725 B2 | 3/2019 | Misu |
| 10,220,726 B2 | 3/2019 | Zing et al. |
| 10,421,350 B2 | 9/2019 | Morrow et al. |
| 2005/0003929 A1 | 1/2005 | Fidlin et al. |
| 2007/0049440 A1 | 3/2007 | Raghavan et al. |
| 2007/0093341 A1 | 4/2007 | Supina et al. |
| 2008/0182693 A1 | 7/2008 | Holmes |
| 2009/0029824 A1 | 1/2009 | Tabata et al. |
| 2009/0084653 A1 | 4/2009 | Holmes |
| 2010/0048338 A1 | 2/2010 | Si |
| 2010/0179009 A1 | 7/2010 | Wittkopp et al. |
| 2011/0070992 A1 | 3/2011 | Si |
| 2011/0251747 A1 | 10/2011 | Imai et al. |
| 2013/0095970 A1 | 4/2013 | Conlon et al. |
| 2013/0338861 A1 | 12/2013 | Hessell et al. |
| 2015/0229162 A1 | 8/2015 | Gottfried |
| 2016/0047439 A1 | 2/2016 | Kimes et al. |
| 2016/0082823 A1* | 3/2016 | Park ................. B60K 6/365 475/5 |
| 2016/0230850 A1 | 8/2016 | Kanada et al. |
| 2016/0325730 A1 | 11/2016 | Ono et al. |
| 2017/0182995 A1 | 6/2017 | Endo et al. |
| 2017/0313182 A1 | 11/2017 | Isono et al. |
| 2017/0327107 A1 | 11/2017 | Ando et al. |
| 2018/0290534 A1 | 10/2018 | Pan et al. |
| 2019/0077255 A1 | 3/2019 | Misu et al. |
| 2019/0077259 A1 | 3/2019 | Singh et al. |
| 2019/0078666 A1 | 3/2019 | Duhaime et al. |
| 2019/0152311 A1 | 5/2019 | Eo et al. |
| 2021/0008968 A1 | 1/2021 | McGrew et al. |
| 2021/0188066 A1* | 6/2021 | McGrew ............... F16H 3/64 |

FOREIGN PATENT DOCUMENTS

| | | |
|---|---|---|
| JP | 2007270865 A | 10/2007 |
| KR | 1020190057981 A | 5/2019 |
| WO | 2018224742 A1 | 12/2018 |

OTHER PUBLICATIONS

PCT, Intl. App. No. PCT/US2020/070940 Written Opinion, 7 pages, dated Mar. 30, 2021.

* cited by examiner

COMPONENT ALIGNMENT FOR A MULTIPLE MOTOR MIXED-SPEED CONTINUOUS POWER TRANSMISSION

BACKGROUND

With the rising concern for the environment there has come an increasing interest in converting vehicles powered by fossil fuels to other forms of energy, such as electricity. This has been the driving force behind some significant developments in electric motor technology. However, these developments have mostly been related to the consumer passenger car market. The technology for commercial vehicles lags behind these new developments. The current electric motors in consumer vehicles are not generally able to produce enough torque for large commercial vehicles. To reach these torque values would require larger and heavier electric motors which would tend to increase energy consumption. Additionally, the loss of power during shift is an unappealing factor of transmissions with electric motors.

Thus, there is a need for improvement in this field.

SUMMARY

A multiple electric motor system has been developed to address the issues mentioned above as well as other issues. In one form, the system includes dual electric motors that provide power to an output such as a driveshaft of a vehicle. One of the electric motors ("A"), which will be referred to as the "first motor" for our purposes, is always connected to the output drive shaft in order to continuously provide power for propelling the vehicle. In other words, the first electric motor (A) has an uninterrupted connection with the output. The system further includes a second electric motor ("B") that intermittently applies torque to the output shaft. In one variation, this intermittent connection between the second electric motor (B) and the output includes at least one clutch. The clutch engages and disengages the second electric motor (B) with the output shaft.

In one form, the outputs of both the first electric motor (A) and the second electric motor (B) are aligned with one another so as to rotate about a common axis of rotation along a longitudinal axis. In one example, the output shaft of the first electric motor (A) is surrounded by the output of the second electric motor (B). In another example, the opposite approach is taken in which the output section of the second electric motor (B) is surrounded by the output of the first electric motor (A).

As should be appreciated, having the axis of rotation of the motors aligned with one another helps to make the overall design more efficient. This efficiency is accomplished by the compact nature of the motor shafts and gearings. Having a compact design for the motor arrangement allows for them to be lighter and therefore more efficient. In addition to this, the longitudinal arrangement allows for there to be a reduced number of gearings in the transmission. The transmission losses are largely due to friction and mesh points between the gearings. Reducing the frequency of these gearings will allow the transmission to run in a more efficient manner. This design is further compact so that the transmission is able to more easily be retrofitted into existing vehicle designs. In one version, the motor shafts and the output shaft are coaxial. This allows for the rotational power created to be funneled directly into the vehicle output and then transmitted to the wheels.

In a further variation, the shafts are longitudinally coupled in an end-to-end longitudinal fashion. The end or tip of one shaft is nested inside the other shaft. At this coupling, a dog clutch collar surrounds this shaft engagement to further stabilize the engagement. Moreover, this end-to-end nested configuration can provide a modular design that allows additional electric motor assemblies to be longitudinally stacked so as to provide additional power. This longitudinal design can further simplify repair because the shafts can be readily replaced without the need for complete or major disassembly the system. For example, damaged or worn shafts can be slid out of the system and a replacement slid back in without significant disassembly.

Aspect 1 generally concerns a system that includes a first electric motor with an uninterrupted connection to an output and a second electric motor with an interruptible connection to the output.

Aspect 2 generally concerns the system of any previous aspect in which the first and second electric motors rotate about a common axis of rotation.

Aspect 3 generally concerns the system of any previous aspect in which the axis of rotation of the second electric motor is aligned with the axis of rotation for a driveshaft of the output.

Aspect 4 generally concerns the system of any previous aspect in which the first electric motor has a first output shaft and the second electric motor has a second output shaft axially aligned along a longitudinal axis.

Aspect 5 generally concerns the system of any previous aspect in which the first output shaft and the second output shaft are coupled in an end-to-end engagement.

Aspect 6 generally concerns the system of any previous aspect in which the first output shaft has a shaft alignment pin received inside the second output shaft.

Aspect 7 generally concerns the system of any previous aspect in which the clutch collar surrounding the end-to-end engagement of the first output shaft and the second output shaft forms a nested arrangement.

Aspect 8 generally concerns the system of any previous aspect in which the second output shaft has a range member received inside the clutch collar.

Aspect 9 generally concerns the system of any previous aspect in which the clutch collar is configured to draw the range member towards the first output shaft during shifting.

Aspect 10 generally concerns the system of any previous aspect in which the clutch engagement member is coupled to the clutch collar to the first output shaft.

Aspect 11 generally concerns the system of any previous aspect in which the first output shaft has a first lubrication channel and the second output shaft has a second lubrication channel fluidly coupled to the first lubrication channel.

Aspect 12 generally concerns the system of any previous aspect in which the first output shaft defines a lubricant supply opening that extends from the first lubrication channel to an exterior of the first shaft.

Aspect 13 generally concerns the system of any previous aspect in which the first output shaft has alignment pins at opposing ends.

Aspect 14 generally concerns the system of any previous aspect in which the second output shaft has an alignment pin at one end and an alignment pin cavity at the opposite end.

Aspect 15 generally concerns the system of any previous aspect in which the alignment pin cavity is surrounded by a range member with one or more range member teeth.

Aspect 16 generally concerns the system of any previous aspect in which the first planetary gear is coupled to the first output shaft and a second planetary gear is coupled to the second output shaft.

Aspect 17 generally concerns the system of any previous aspect in which the first output shaft has first sun gear teeth forming part of the first planetary gear and the second output shaft has second sun gear teeth forming part of the second planetary gear.

Aspect 18 generally concerns the system of any previous aspect in which the first electric motor has a first output shaft that encloses a second output shaft of the second electric motor.

Aspect 19 generally concerns the system of any previous aspect in which the first electric motor has a first output shaft that is attached by a second output shaft of the second electric motor.

Aspect 20 generally concerns the system of any previous aspect in which the first electric motor and the second electric motor are selectively coupled through a split shaft that has a clutch located between the motors.

Aspect 21 generally concerns a method of operating the system of any previous aspect. Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
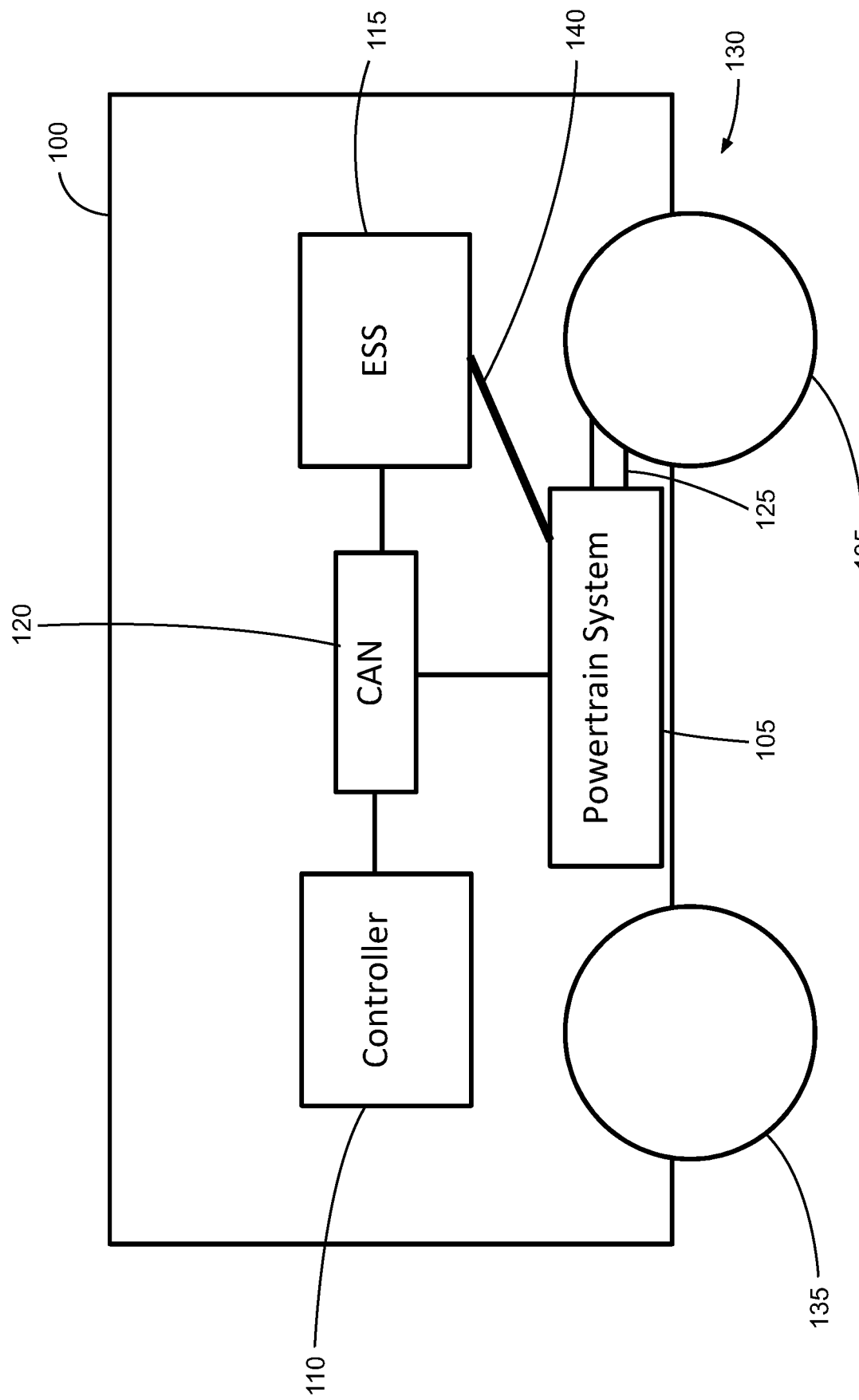
FIG. 1 is a diagrammatic view of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A vehicle 100 according to one example is illustrated in FIG. 1. As shown, the vehicle 100 includes at least one powertrain system 105, at least one controller 110, and at least one Energy Storage System ("ESS") 115 configured to supply power to the powertrain system 105. The powertrain system 105, controller 110, and ESS 115 are operatively connected together so as to communicate with one another via at least one Controller Area Network ("CAN") 120. The controller 110 is configured to control the operation of one or more systems and/or other components of the vehicle 100 such as the powertrain system 105 and ESS 115. The powertrain system 105 has an output or drive shaft 125 that transfers mechanical power from the powertrain system 105 to a propulsion system 130. In the illustrated example, the propulsion system 130 includes one or more wheels 135, but the propulsion system 130 in further examples can include other types of propulsion devices like continuous track systems. One or more power cables 140 transfer electrical power between the powertrain system 105 and the ESS 115.

The powertrain system 105 is designed to electrically propel the vehicle 100 in an efficient manner. As will be explained in greater detail below, the powertrain system 105 is designed to power heavy-duty commercial and/or military grade vehicles such as buses, garbage trucks, delivery trucks, fire trucks, and semi-trailers. The powertrain system 105 is designed to electrically power vehicles 100 with a class group rating of at least four (4) according to the US Department of Transportation Federal Highway Administration (FHWA) classification rule set. In one form, the powertrain system 105 is configured to move at least 40,000 pound (18,144 Kg) passenger vehicles like buses. The powertrain system 105 has a unique, compact centerline design that allows the powertrain system 105 to be easily retrofitted into pre-existing vehicle chassis designs and/or conventional drivetrains with minimal changes to the other parts of the vehicle 100 like the braking and suspension systems. This in turn allows existing internal combustion type vehicles to be readily reconfigured as fully electric vehicles. Moreover, the centerline design of the powertrain system 105 reduces gear loss and other power losses so as to make the vehicle 100 more power efficient which in turn can improve driving range and/or reduce weight of other components such as the ESS 115.

Figure 2:
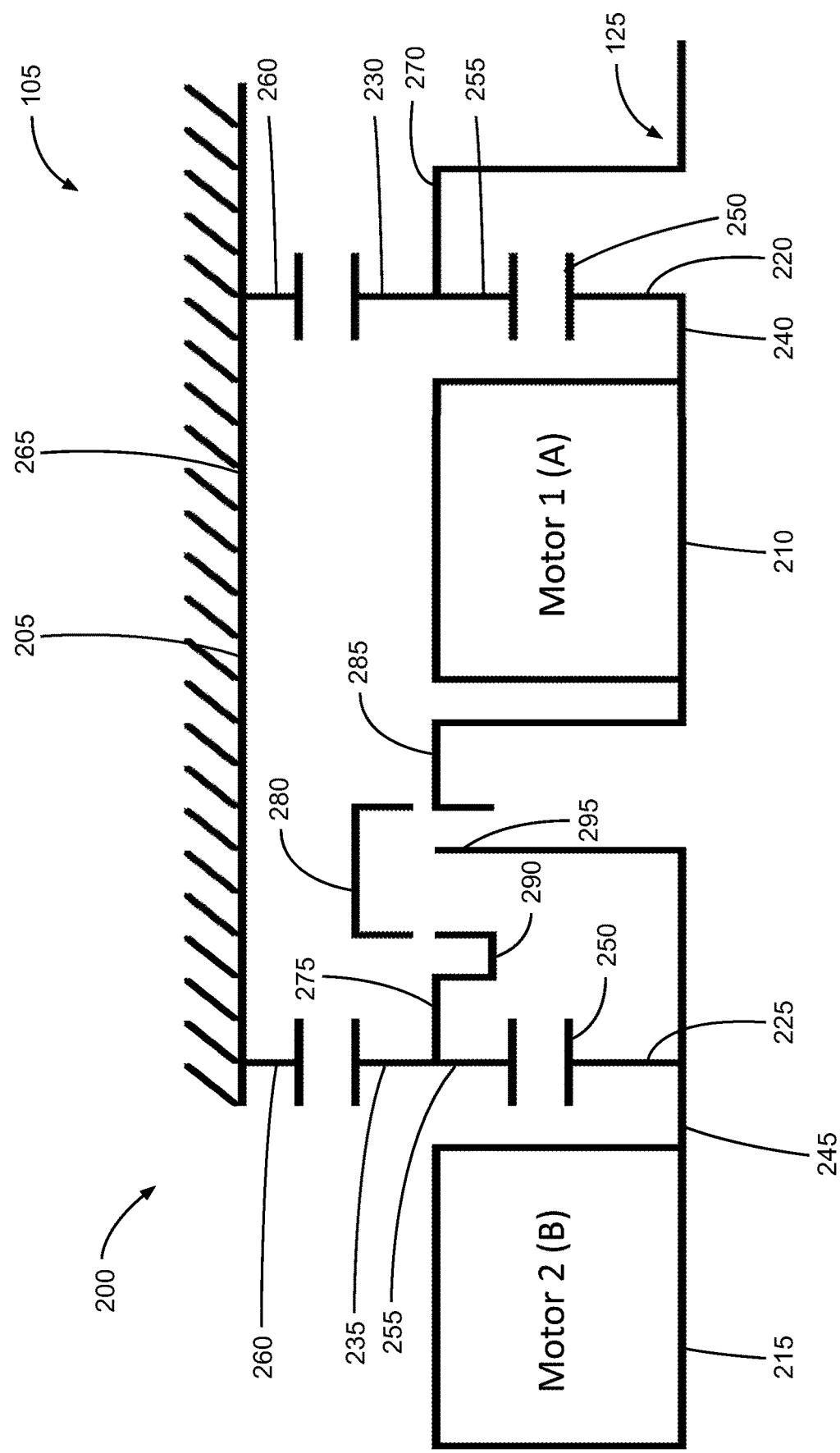
FIG. 2 is a diagrammatic view of one example of an electric powertrain that can be used in the vehicle of FIG. 1.

FIG. 2 shows a diagram of one example of an electric powertrain 200 that can be used in the powertrain system 105 of FIG. 1. As depicted, the electric powertrain 200 includes a multiple motor continuous power transmission 205. The transmission 205 of the electric powertrain 200 includes a first electric motor 210, which is referred to as "Motor A" occasionally, and a second electric motor 215 that is referred to as "Motor B" at times. In one example, the first electric motor 210 and second electric motor 215 are the same type of electric motor such that both motors generally provide the same speed and torque output within normal manufacturing tolerances. The first electric motor 210 and second electric motor 215 in one form are both high speed electric motors, and in another form, the first electric motor 210 and second electric motor 215 are both low speed electric motors. In alternative variations, the first electric motor 210 and second electric motor 215 can be different types (e.g., permanent magnet motors, induction motors, switched reluctance motors, etc.) and/or have different designs/configurations (e.g., pole counts, winding patterns, etc.).

The transmission 205 of the electric powertrain 200 further includes a first gear train 220 located at an output end of the first electric motor 210 and a second gear train 225 located at the output end of the second electric motor 215. As can be seen, the first gear train 220 is located at the output end of the entire transmission 205 that is proximal to the drive shaft 125. The second gear train 225 is sandwiched or located between the first electric motor 210 and the second electric motor 215. This configuration allows the electric powertrain 200 to have a compact design. In the illustrated example, the first gear train 220 is in the form of a first planetary gear 230, and the second gear train 225 is in the form of a second planetary gear 235. The first electric motor 210 and second electric motor 215 respectively have a first output shaft 240 and a second output shaft 245 for providing rotational mechanical power. As illustrated in FIG. 2, the first planetary gear 230 and second planetary gear 235 each has a sun gear 250, one or more planet gears 255 meshed with the sun gear 250, and a ring gear 260 that surrounds and meshes with the planet gears 255. The sun gear 250 of the first planetary gear 230 is secured to the first output shaft 240 of the first electric motor 210, and the sun gear 250 of the second planetary gear 235 is secured to the second output shaft 245 of the second electric motor 215. Both ring gears 260 of the first planetary gear 230 and the second planetary gear 235 are secured to a housing 265 of the electric powertrain 200. The planet gears 255 of the first planetary gear 230 are carried by a first carrier 270. The first carrier 270 is configured to connect with the drive shaft 125 so as to transfer mechanical power from the transmission 205 to the propulsion system 130. The planet gears 255 of the second planetary gear 235 are carried by a second carrier 275.

As shown in FIG. 2, the electric powertrain 200 includes at least one clutch 280 that engages and disengages the second electric motor 215 from the first electric motor 210. Through the clutch 280, the transmission 205 of the electric powertrain 200 is further able to shift gears such that the speed and torque from second electric motor 215 can be changed. The first electric motor 210 is permanently connected to the drive shaft 125 (i.e., there is no clutch) such that the first electric motor 210 is able to provide continuous power to the drive shaft 125 and propulsion system 130. In other words, the first electric motor 210 has an uninterrupted connection to the drive shaft 125, and the second electric motor 215 has an interruptible connection to the drive shaft 125. This configuration of the electric powertrain 200 facilitates power shifting in which power is always able to be provided to the wheels 135 even when shifting of the clutch 280 occurs. With power being continuously provided, any shifting can be made generally imperceptible to the driver and/or passengers. Moreover, acceleration performance of the vehicle 100 is enhanced, and the vehicle 100 is better able to maintain speed at higher grades.

In the illustrated example, the electric powertrain 200 includes a single clutch 280, but the electric powertrain 200 in other examples can include more than one clutch. In one variation, the clutch 280 is a dog clutch (e.g., 3-way dog clutch), and in another, the clutch 280 includes a dog clutch (e.g., 2-way dog clutch) along with a Selectable One-Way Clutch (SOWC). In further variations, the clutch 280 includes a wet disc type clutch or a dry disc type clutch. The first output shaft 240 for the first electric motor 210 has a clutch engagement member 285 where the clutch 280 is able to selectively engage different range members on the second output shaft 245 and the second carrier 275. The second carrier 275 of the second planetary gear 235 has a first range member 290 where the clutch 280 engages when in a first range position. When in the first range position, the clutch 280 connects the first range member 290 to the clutch engagement member 285 such that the speed (i.e., rpm) provided by the second electric motor 215 is reduced through the second gear train 225, and the torque provided by the second electric motor 215 to the first output shaft 240 is increased through the planet gears 255 of the second planetary gear 235. The second output shaft 245 of the second electric motor 215 has a second range member 295 where the clutch 280 engages when in a second range position. When in the second range position, the clutch 280 connects the second range member 295 to the clutch engagement member 285 such that the speed and torque of the second electric motor 215 is directly provided to the first output shaft 240 of the first electric motor 210. As compared to the first range position, the speed of the second electric motor 215 provided to the first output shaft 240 of the first electric motor 210 is faster, and the torque is less.

The clutch 280 can further be positioned at a neutral position where the second electric motor 215 is not mechanically coupled to the first electric motor 210. In the neutral or shift position, the first electric motor 210 can provide the sole mechanical power to propel the vehicle 100. Among other things, this ability to propel the vehicle 100 solely via the first electric motor 210 while the second electric motor 215 is disconnected from the first output shaft 240 allows the second electric motor 215 to synchronize speed with the first electric motor 210 in order to engage the clutch 280 (e.g., when the clutch 280 is a dog clutch) without power interruption to the vehicle 100. This also allows the first electric motor 210 to operate at a more efficient point than when sharing the output load with the second electric motor 215.

By using more than one electric motor, the powertrain system 105 is configured to allow smaller, consumer automotive electric motors to be used to power larger, commercial-grade vehicles such as those with a FHWA class rating of four (4) or higher. For instance, consumer automotive electric motors can be used to move vehicles 100 weighing 40,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

Due to high demand and high production volumes, improvements in electric motor technology tends to occur more rapidly in the consumer space such that it is expected that these benefits of consumer automotive electric motors over lower demand commercial-grade electric vehicle motors will become more pronounced in the future. However, there are still drawbacks to using these consumer-grade electric motors for heavy commercial vehicles. Individual consumer-grade electric vehicle motors tend to produce insufficient torque to properly move and/or accelerate heavy duty vehicles such as buses and semi-trucks. There is also a trend to have the consumer-grade electric motors operate at even higher speed or rotations per minute (rpms) which are not desirable for heavy duty commercial-grade vehicles which tend to operate at lower speeds and require higher torques.

To facilitate the use of these consumer electric vehicle motors in heavy duty commercial applications, the powertrain system 105 includes at least two electric motors (e.g., the first electric motor 210 and second electric motor 215) so as to provide sufficient torque and power to the drive shaft 125 and the propulsion system 130. The powertrain system 105 further includes at least the first gear train 220 so as to reduce the speed and increase the torque provided by the first electric motor 210 and/or second electric motor 215. As shown, the powertrain system 105 can include additional gear trains, such as the second gear train 225, to enhance the performance of the powertrain system 105.

This multiple motor design also can use energy more efficiently. The power, speed, and/or torque provided by the first electric motor 210 and the second electric motor 215 can be adjusted so that the motors operate in a more efficient manner for differing operational conditions. For example, the clutch 280 can change the gear ratios of the second gear train 225 so as to adjust the output speed and/or torque provided by the second electric motor 215. The clutch 280 can further be used to disconnect the second electric motor 215 from the first electric motor 210 such that the first electric motor 210 provides all of the propulsive mechanical power to the drive shaft 125. At the same time, the second electric motor 215 can be shut down to conserve power and allow the first electric motor 210 to operate within an efficient power band, or the speed of the second electric motor 215 can be changed for shifting purposes. Once more, with the first electric motor 210 permanently connected to the drive shaft 125, power can be always applied to the propulsion system 130 such that any shifting of the second gear train 225 via the clutch 280 can be imperceptible to the driver and/or passengers of the vehicle 100. Given the first electric motor 210 continuously provides power to the wheels 135, the powertrain system 105 can take the proper time during shifting so as to enhance efficiency and performance of the vehicle 100. The powertrain system 105 is able to provide more than adequate time to deal with timing and synchronization issues between the first electric motor 210, second electric motor 215, second gear train 225, and/or clutch 280. By providing additional time for shifting without interrupting power, better synchronization can occur before clutch engagement which in turn prolongs the life of the clutch 280.

This unique two-motor architecture further enhances energy efficiency. For example, the controller 110 can set the torque of the first electric motor 210 to zero (0) such that the second electric motor 215 solely propels the vehicle 100. For instance, this can occur at low vehicle speeds where the speed of the first electric motor 210 would be too slow for the first electric motor 210 to operate in a highly efficient region, and at other times, the torque and speed profiles can depend on the types and designs of the two motors.

Figure 3:
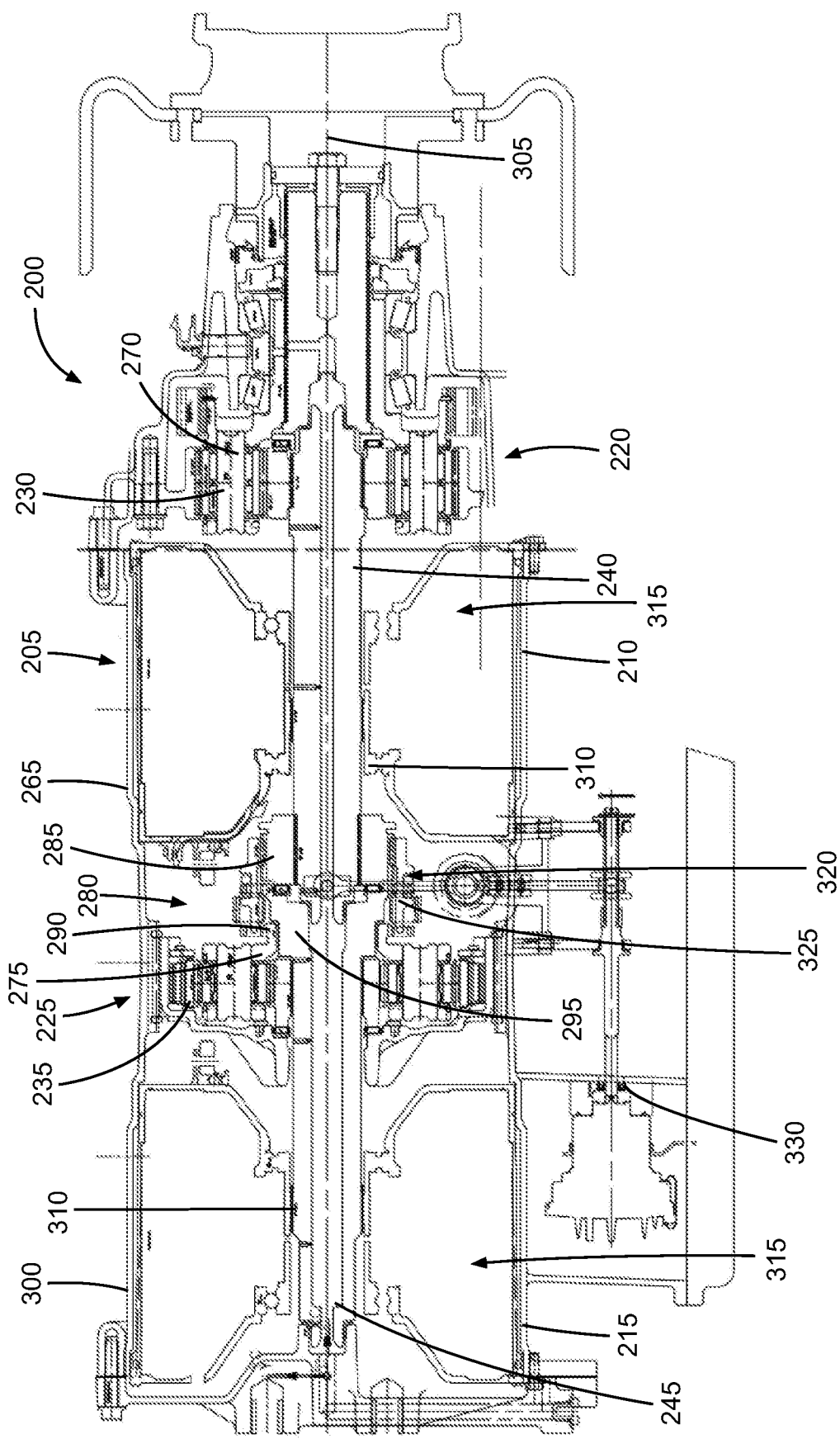
FIG. 3 is a cross-sectional view of one example of the electric powertrain of FIG. 2.

One example of the transmission 205 in the electric powertrain 200 is illustrated in FIG. 3. As can be seen, the electric powertrain 200 in this example includes an electric motor transmission 300 that is constructed in a similar fashion to the transmission 205 shown in FIG. 2. For example, the electric motor transmission 300 includes the first electric motor 210, second electric motor 215, first gear train 220, and second gear train 225 of the type described before. The first gear train 220 is in the form of the first planetary gear 230, and the second gear train 225 is in the form of the second planetary gear 235. The first planetary gear 230 is mounted to the first output shaft 240, and the second planetary gear 235 is mounted to the second output shaft 245. The first output shaft 240 and second output shaft 245 as well as the rest of the components of the electric motor transmission 300 rotate about and are oriented along a longitudinal axis 305 so as to give the electric motor transmission 300 a centerline orientation. The centerline orientation allows for the 1:1 ratio to be more efficient than a layshaft architecture with the motors on parallel which requires a gear mesh to provide power back to the output centerline. There is no such gear mesh loss for the 1:1 ratio in the illustrated centerline orientation. These power loss differentials are further magnified due to losses not only during propulsion but also during regenerative braking.

The components of the electric motor transmission 300 are housed inside the housing 265. As shown in FIG. 3, the first electric motor 210 and the second electric motor 215 each include a rotor 310 and a stator 315. The rotor 310 of the first electric motor 210 is secured to the first output shaft 240, and the rotor 310 of the second electric motor 215 is secured to the second output shaft 245. The stators 315 are in turn secured to the housing 265. The rotors 310 are configured to rotate relative to the fixed stators 315. When rotating, the rotor 310 of the first electric motor 210 rotates the first output shaft 240 which in turn powers the first planetary gear 230. The first planetary gear 230 reduces the output speed of the first electric motor 210 and/or second electric motor 215 that is supplied to the drive shaft 125 via the first carrier 270. Again, this speed reduction by the first gear train 220 can facilitate the use of higher speed consumer vehicle electric motors in heavy commercial-grade vehicles.

The rotor 310 of the stator 315 rotates the second output shaft 245 which in turn powers the second planetary gear 235. Again, the second planetary gear 235 has the second carrier 275 that is configured to transfer mechanical power to the first output shaft 240 via the clutch 280. The clutch 280 in FIG. 3 is a positive clutch 320 in the form of a dog clutch 325. The dog clutch 325 is actuated or moved by a clutch actuator 330. The clutch actuator 330 is operatively connected to and controlled by the controller 110 over the CAN 120. In one form, the clutch actuator 330 includes an electric motor or solenoid with linkages that actuate the clutch 280 so as to engage or disengage from the first range member 290 or second range member 295. The controller 110 is further operatively connected to the first electric motor 210 and second electric motor 215 to control the speed, torque, and/or relative positions of the first electric motor 210 and second electric motor 215.

With the positive clutch 320 using an interface type connection, the dog clutch 325 dramatically reduces power loss caused by slippage which is commonly present in friction type clutches such as wet and dry disc clutches. Wet and dry clutches further typically require high hydraulic pressures. On the other hand, dog clutches normally just require low lubrication pressures. Thus, the dog clutch 325 lowers the pressure requirements for the hydraulic system in the electric motor transmission 300. The overall design of the electric powertrain 200 facilitates the use of the dog clutch 325. With the first electric motor 210 able to provide continuous power to the drive shaft 125 when needed, the controller 110 can take the time to allow the second electric motor 215 to properly spin up or down to match the speed and relative position of the first range member 290 or second range member 295 with the clutch engagement member 285 of the first electric motor 210 so as to facilitate smooth engagement with minimal power loss.

As can be seen in FIG. 3, the second gear train 225 and clutch 280 are able to be received between the first electric motor 210 and second electric motor 215 so as to provide a compact configuration. Once more, this compact centerline configuration allows the electric motor transmission 300 to be readily retrofitted into preexisting vehicle designs with minimal redesign to major systems such as the suspension, braking, and steering systems. While only two motors are illustrated, the electric powertrain 200 can have more than two motors. For instance, this design is modular such that additional motors, gear trains, and/or clutches can be daisy-chained to the end of the second electric motor 215 so as to provide additional mechanical power.

Figure 4:
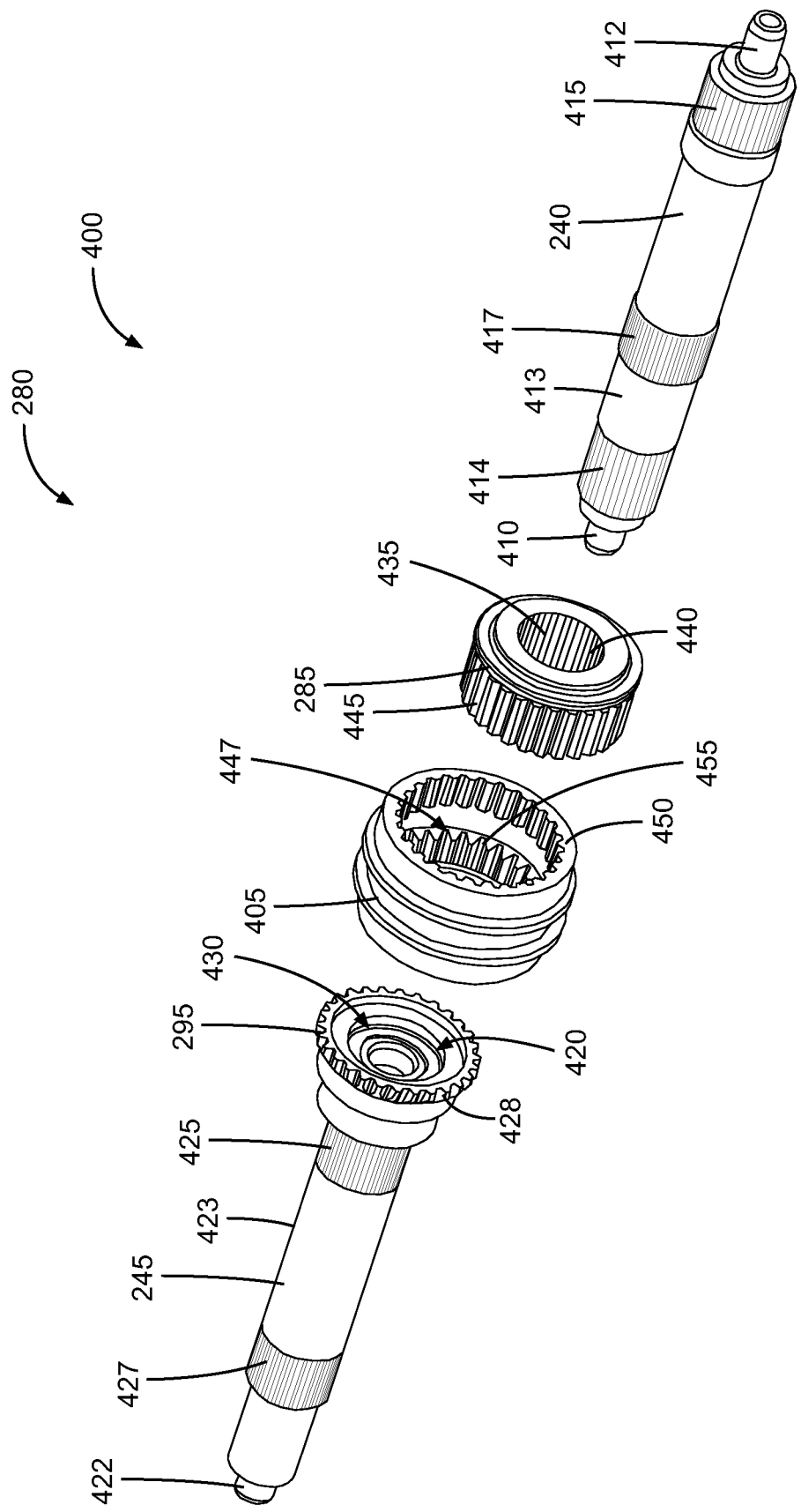
FIG. 4 is an exploded view of one example of a shaft assembly.

FIG. 4. shows an exploded view of a shaft assembly 400 used in the electric powertrain 200. As shown, the shaft assembly 400 includes the first output shaft 240, second output shaft 245, clutch 280, clutch engagement member 285, and a clutch collar 405 that are positioned along the longitudinal axis 305 (FIG. 3). The first output shaft 240 and second output shaft 245 are aligned along the longitudinal axis 305 in an end-to-end or longitudinally stacked relationship. As will be explained in greater detail below, this end-to-end orientation among other things allows the electric powertrain 200 to have a modular design. Additional motor-gear assemblies can be stacked onto the end of the electric powertrain 200 to provide additional power or other functionalities. Moreover, this design can further simplify repair.

The first output shaft 240 has a shaft alignment pin 410 and an output alignment pin 412 at opposing ends of the first output shaft 240. Between the shaft alignment pin 410 and output alignment pin 412, the first output shaft 240 has a first shaft body 413 that has a larger diameter as compared to the shaft alignment pin 410 and output alignment pin 412. The shaft alignment pin 410 and output alignment pin 412 in the illustrated example each have a cylindrical shape to facilitate alignment and relative rotation of the first output shaft 240. At the end proximal to the shaft alignment pin 410, the first shaft body 413 of the first output shaft 240 has one or more clutch engagement member splines 414, and the first shaft body 413 at the end proximal to the output alignment pin 412 has one or more first sun gear teeth 415 that engage the first planetary gear 230. The first output shaft 240 further has one or more first motor engagement splines 417 positioned on the first shaft body 413 between the clutch engagement member splines 414 and first sun gear teeth 415. The first electric motor 210 is secured to the first output shaft 240 via the first motor engagement splines 417.

As noted before, the first output shaft 240 and second output shaft 245 are aligned along the longitudinal axis 305 in an end-to-end relationship. To facilitate this alignment, the second output shaft 245 defines an alignment pin cavity 420 that receives the shaft alignment pin 410, and at the end opposite the alignment pin cavity 420, the second output shaft 245 has a upstream alignment pin 422. As shown, the entrance of the alignment pin cavity 420 is surrounded by the second range member 295. Between the end with the alignment pin cavity 420 and the upstream alignment pin 422, the second output shaft 245 has a second shaft body 423 that has a diameter that is larger than that of the upstream alignment pin 422. Proximal the second range member 295 and the alignment pin cavity 420, the second shaft body 423 of the second output shaft 245 has one or more second sun gear teeth 425, and proximal to the upstream alignment pin 422, the second shaft body 423 has one or more second motor engagement splines 427. The second planetary gear 235 engages the second sun gear teeth 425 on the second output shaft 245, and the rotor 310 of the second electric motor 215 is secured to the second motor engagement splines 427 on the second output shaft 245. As illustrated, the second range member 295 has one or more second range member teeth 428 circumferentially disposed around the second range member 295 that facilitate shifting of the clutch 280.

The engagement between the shaft alignment pin 410 and alignment pin cavity 420 maintain the second output shaft 245 and first output shaft 240 alignment. Located just outside of the alignment pin cavity 420 is an alignment pin lip 430. The end of the first shaft body 413 is received in the alignment pin lip 430. Once more, the shaft alignment pin 410 allows for the first output shaft 240 and second output shaft 245 to have the same axis of rotation, the longitudinal axis 305. Having the axis of rotation along the longitudinal axis 305 allows for a decrease in the amount of gearing meshes in the electric powertrain 200 which in turn reduces energy loss.

As shown in FIG. 4, the clutch engagement member 285 define a first shaft opening 435 in which the clutch engagement member splines 414 of the first output shaft 240 are received. Around the first shaft opening 435, the clutch engagement member 285 has one or more first shaft engagement splines 440 that engage the clutch engagement member splines 414 of the first output shaft 240. The clutch engagement member 285 further has one or more collar engagement teeth 445 extending around the outer periphery of the clutch engagement member 285.

In the illustrated example, the clutch engagement member 285 is generally ring-shaped. The clutch collar 405 defines a collar teeth 450 that receives the clutch engagement member 285. Surrounding the collar cavity 447, the clutch collar 405 has one or more collar teeth 450 that engage the collar engagement teeth 445 on the clutch engagement member 285. The clutch collar 405 further has one or more shifting teeth 455 disposed around the collar cavity 447. The collar engagement teeth 445 of the clutch collar 405 are configured to selectively engage the second range member teeth 428 on the second range member 295 of the second output shaft 245 during shifting.

In the illustrated example, the clutch 280 is a positive clutch, and more particularly, a dog clutch that does not have a synchronizer mechanism or synchromesh. Other types of clutches can be used in other examples. As will be explained in greater detail, to further bolster alignment between the first output shaft 240 and second output shaft 245, the clutch collar 405 surrounds the end-to-end, longitudinal connection of the shaft alignment pin 410 of the first output shaft 240 in the alignment pin cavity 420 of the second output shaft 245.

Figure 5:
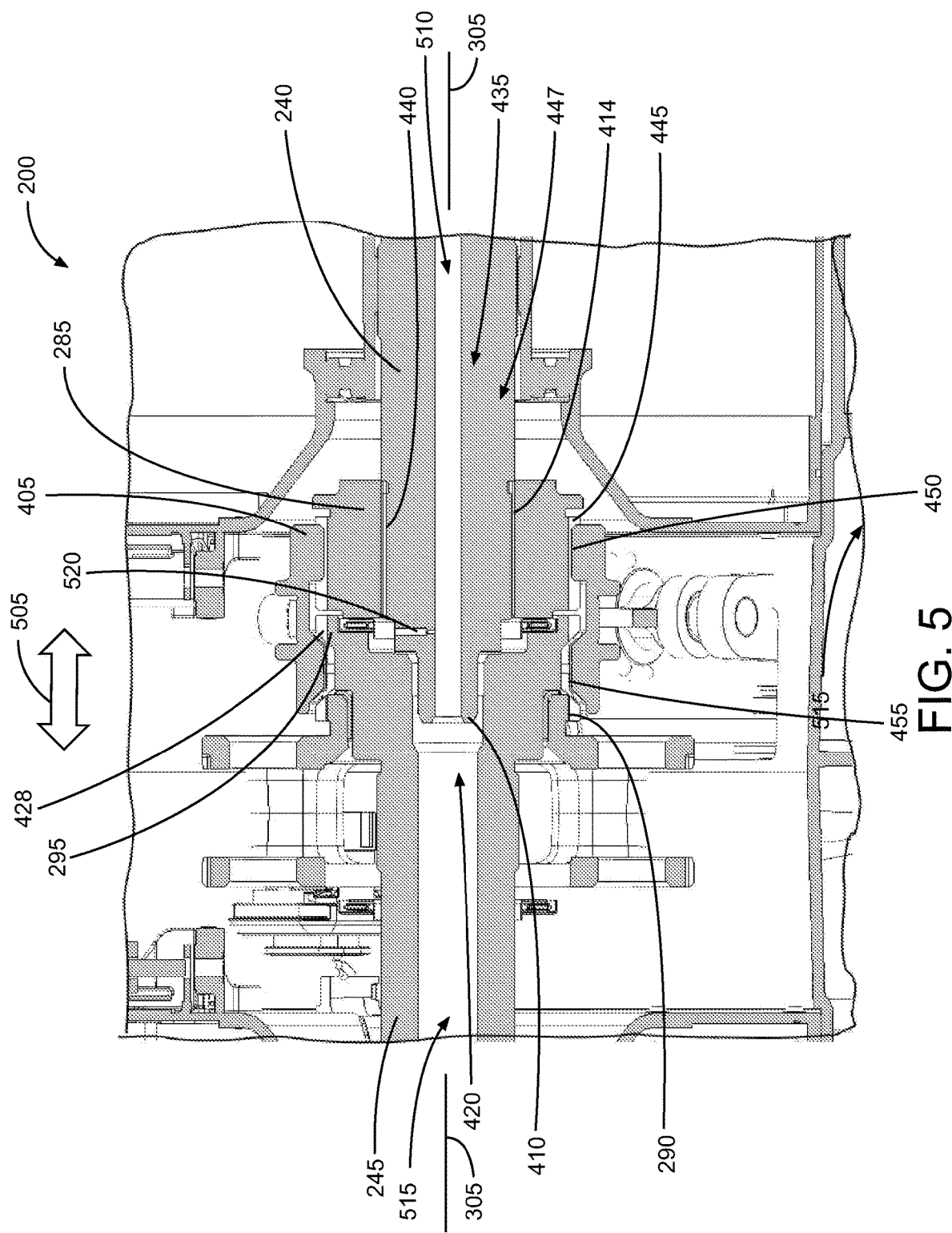
FIG. 5 is a cross-sectional view of an engagement between a first output shaft and a second output shaft in the FIG. 2 electric powertrain.

FIG. 5 shows an enlarged cross-sectional view of the electric powertrain 200 around where the first output shaft 240 engages with the second output shaft 245 in the end-to-end configuration. As shown, the shaft alignment pin 410 is received in the alignment pin cavity 420, and the clutch collar 405 surrounds this engagement between the first output shaft 240 and second output shaft 245. In other words, the clutch collar 405 and the connection between the first output shaft 240 and second output shaft 245 are arranged in a concentric or nested manner. Among other things, this concentric or nested arrangement helps to stabilize this longitudinal engagement between the first output shaft 240 and second output shaft 245. The first shaft engagement splines 440 of the clutch engagement member 285 engage the clutch engagement member splines 414 of the first output shaft 240 at the first shaft opening 435, and the collar teeth 450 of the clutch collar 405 engage the collar engagement teeth 445 of the clutch engagement member 285. As depicted by a double arrow 505 in FIG. 5, the clutch collar 405 is able to slide along the longitudinal axis 305 in order to shift gears. For example, the clutch collar 405 is able to slide to selectively engage and disengage the shifting teeth 455 with the teeth of the first range member 290 and the second range member teeth 428 on the second range member 295. The clutch collar 405 can also be positioned in a neutral position, as is depicted in FIG. 5. When the clutch 280 is in the neutral position, the second electric motor 215 is not mechanically coupled to the first electric motor 210 such that the second electric motor 215 is unable to supply torque to the first output shaft 240.

This end-to-end longitudinal shaft arrangement can further enhance lubrication and cooling of components in the electric powertrain 200. As can be seen, the first output shaft 240 defines a first lubrication channel 510 through which lubricant flows, and the second output shaft 245 defines a second lubrication channel 515 through which the lubricant flows. The first lubrication channel 510 and second lubrication channel 515 extend along the longitudinal axis 305 for the full length of the first output shaft 240 and second output shaft 245, respectively. When the first output shaft 240 and second output shaft 245 are connected, the lubricant is able to flow between the first lubrication channel 510 and second lubrication channel 515. The first output shaft 240 and second output shaft 245 each can have one or more lubricant supply openings 520 to supply the lubricant to various components inside the electric powertrain 200.

Figure 6:
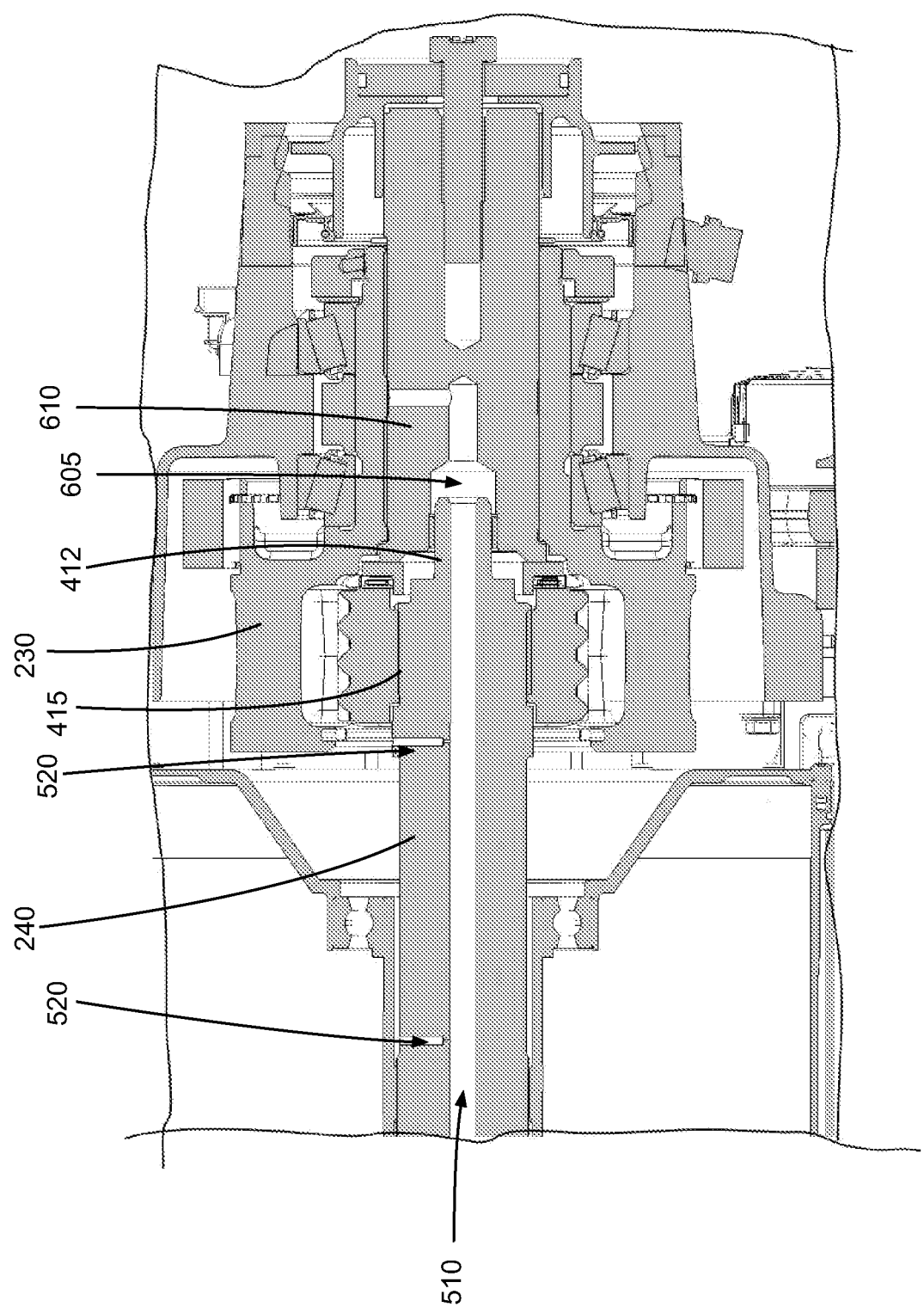
FIG. 6 is a cross-sectional view of the first output shaft engaging an output shaft coupling in the FIG. 2 electric powertrain.

Looking at FIG. 6, the lubricant supply along the first lubrication channel 510 can be connected to other components. The output alignment pin 412 of the first output shaft 240 is received in an output opening 605 of an output shaft coupling 610. The output shaft coupling 610 is coupled to the drive shaft 125.

Figure 7:
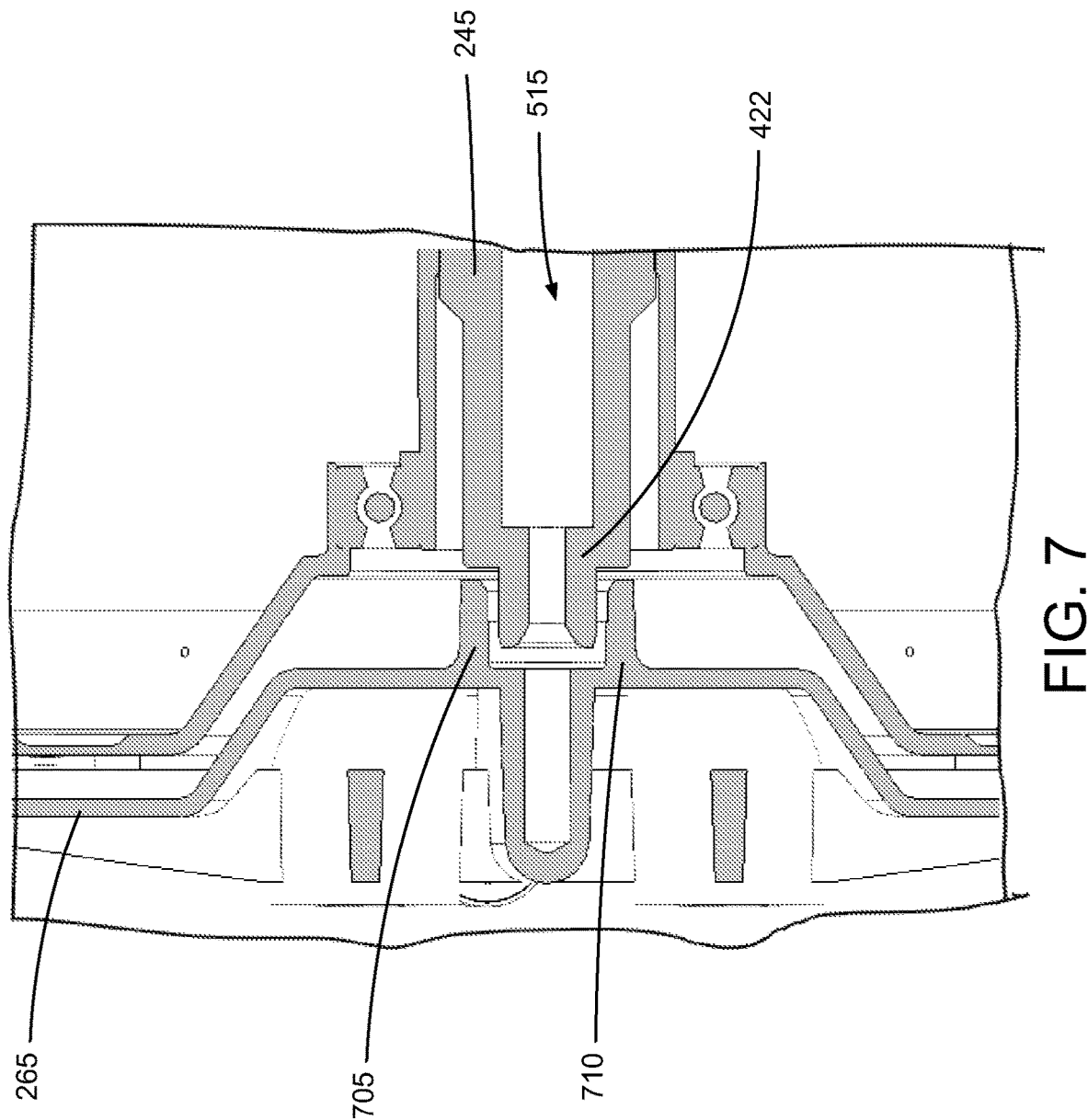
FIG. 7 is a cross-sectional view of the second output shaft engaging an end cap in the FIG. 2 electric powertrain.

At the opposite end, as shown in FIG. 7, the upstream alignment pin 422 of the second output shaft 245 is received in a shaft alignment collar 705 of an end cap 710 that forms part of the housing 265. As alluded to before, the end-to-end longitudinal relationship of the first output shaft 240 and second output shaft 245 facilitates a more flexible modular design because additional electric motors can be coupled to the electric powertrain 200. For example, another electric motor assembly with a shaft configured in the same or similar manner to the second output shaft 245 can coupled to the upstream alignment pin 422 of the second output shaft 245. In such a case, the upstream alignment pin 422 of the second electric motor 215 is received in the corresponding alignment pin cavity 420 of the third electric motor assembly. The second planetary gear 235 and clutch 280 as well as the other components can be coupled in a similar fashion as was described before with respect to the second electric motor 215.

Again, having the shafts longitudinally coupled in an end-to-end longitudinal fashion can provide a modular design that allows additional electric motor assemblies to be longitudinally stacked so as to provide additional power. This longitudinal design can further simplify repair because the shafts can be readily replaced without the need for complete or major disassembly of the system. For example, damaged or worn shafts can be slid out of the system, and a replacement slid back in without significant disassembly.

Figure 8:
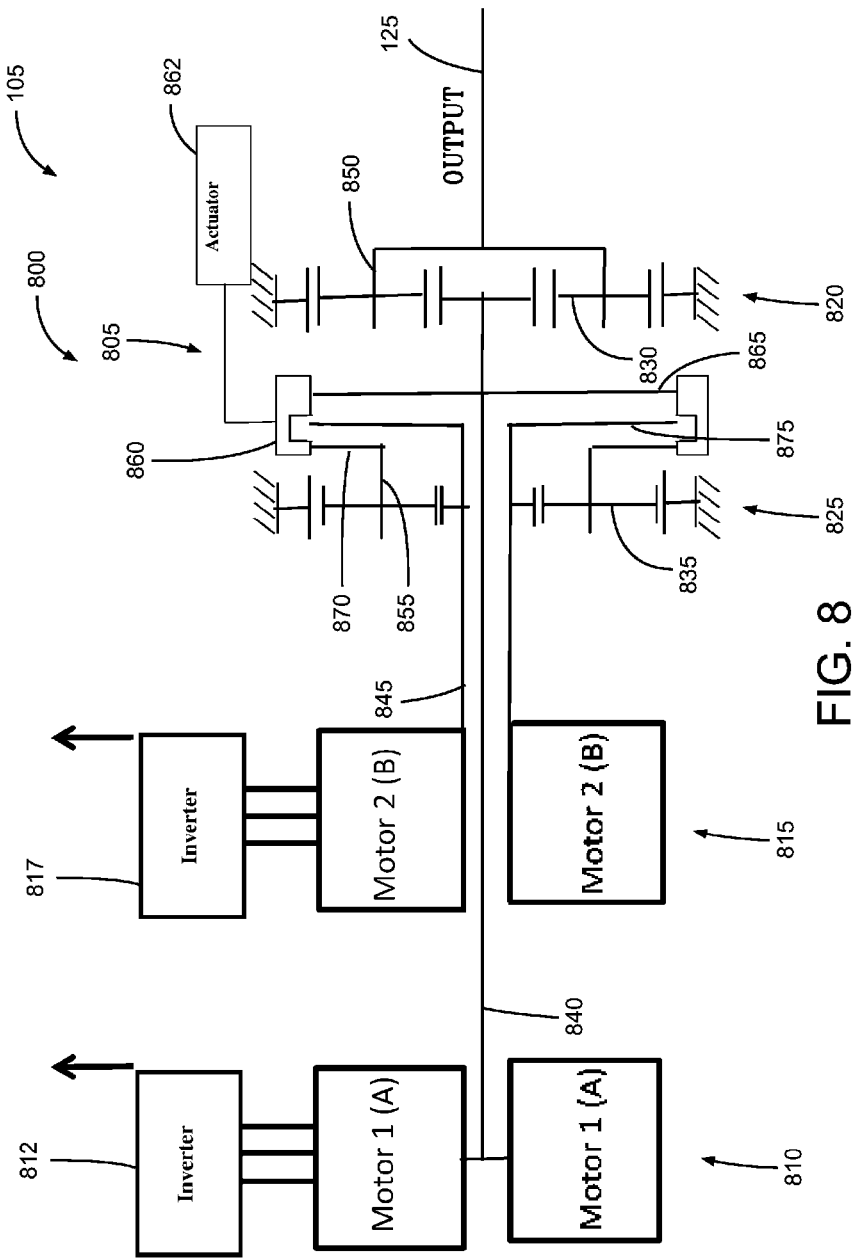
FIG. 8 is a diagrammatic view of another example of an electric powertrain that can be used in the vehicle of FIG. 1.
Figure 9:
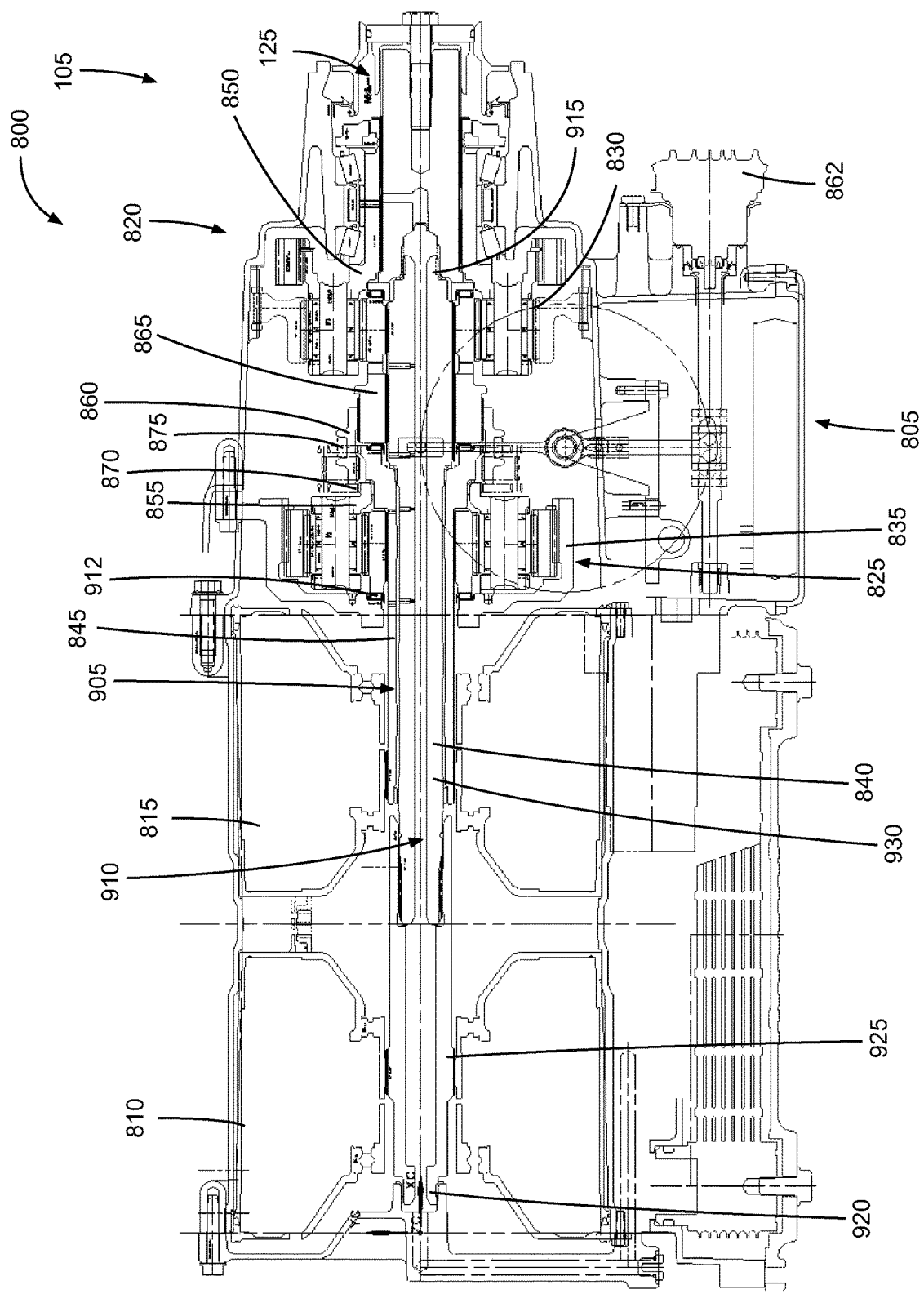
FIG. 9 is a cross-sectional view of the electric powertrain shown in FIG. 8.

FIG. 8 shows a diagram of another example of an electric powertrain 800 that can be used in the powertrain system 105 of FIG. 1. FIG. 9 shows a cross-sectional view of the electric powertrain 800. The electric powertrain 800 shares a number of components and functions in common with the ones described before (see e.g., FIGS. 2 and 3). For the sake of brevity as well as clarity, these common features will not be described in great detail below, but please refer to the previous discussion.

As depicted, the electric powertrain 800 includes a multiple motor continuous power transmission 805. The transmission 805 of the electric powertrain 800 includes a first electric motor 810 with a first inverter 812 and a second electric motor 815 with a second inverter 817. The first inverter 812 is electrically connected between the ESS 115 and the first electric motor 810, and the second inverter 817 is electrically connected between the ESS 115 and the second electric motor 815. The first inverter 812 and second inverter 817 convert the direct current (DC) from the ESS 115 to alternating current (AC) in order to power the first electric motor 810 and second electric motor 815, respectively. The first electric motor 810 and second electric motor 815 can also act as generators such as during regenerative braking. In such a situation, the first inverter 812 and second inverter 817 convert the AC electrical power from the first electric motor 810 and second electric motor 815, respectively, to DC power that is supplied to the ESS 115. In one example, the first electric motor 810 and second electric motor 815 are the same type of electric motor such that both motors generally provide the same speed and torque output within normal manufacturing tolerances. The first electric motor 810 and second electric motor 815 in one form are both high speed electric motors, and in another form, the first electric motor 810 and second electric motor 815 are both low speed electric motors. In alternative variations, the first electric motor 810 and second electric motor 815 can be different such that one for example is a high speed motor and the other is a low speed motor.

The transmission 805 of the electric powertrain 800 further includes a first gear train 820 and a second gear train 825 both located at an output end of the first electric motor 810 and the second electric motor 815. As can be seen, the first gear train 820 is located at the output end of the entire transmission 805 that is proximal to the drive shaft 125. The second gear train 825 is sandwiched or located between the second electric motor 815 and the first gear train 820. This configuration helps to dampen noise created by the second gear train 825. In the illustrated example, the first gear train 820 is in the form of a first planetary gear 830, and the second gear train 825 is in the form of a second planetary gear 835. The first electric motor 810 and second electric motor 815 respectively have a first output shaft 840 and a second output shaft 845 for providing rotational mechanical power. In the illustrated example, the second output shaft 845 is hollow such that the first output shaft 840 is able to extend through the second output shaft 845 in a concentric manner. Similar to the previous examples, the first planetary gear 830 has a first carrier 850 that is connected to the drive shaft 125, and the second planetary gear 835 has a second carrier 855.

As shown in FIGS. 8 and 9, the electric powertrain 800 includes at least one clutch 860 with a clutch actuator 862 that engages and disengages the second electric motor 815 from the first electric motor 810. Through the clutch 860, the transmission 805 of the electric powertrain 800 is further able to shift gears such that the speed and/or torque from second electric motor 815 can be changed. The first electric motor 810 is permanently connected to the drive shaft 125 (i.e., there is no clutch) such that the first electric motor 810 is able to provide continuous power to the drive shaft 125 and propulsion system 130. In other words, the first electric motor 810 has an uninterrupted connection to the drive shaft 125, and the second electric motor 815 has an interruptible connection to the drive shaft 125. This configuration of the electric powertrain 800 facilitates power shifting in which power is always able to be provided to the wheels 135 even when shifting of the clutch 860 occurs. With power being continuously provided, any shifting can be made generally imperceptible to the driver and/or passengers.

In the illustrated example, the electric powertrain 800 includes a single clutch 860, but the electric powertrain 800 in other examples can include more than one clutch. In one variation, the clutch 860 is a dog clutch, and in another, the clutch 860 is a Selectable One-Way Clutch (SOWC). In further variations, the clutch 860 includes a wet disc type clutch or a dry disc type clutch. As should be appreciated, using a wet disc type clutch or a dry disk type clutch requires the use of more than one clutch in order to replace the dog clutch. The first output shaft 840 for the first electric motor 810 has a clutch engagement member 865 where the clutch 860 is able to engage the first output shaft 840. The second carrier 855 of the second planetary gear 835 has a first range member 870 where the clutch 860 engages when in a first range position. When in the first range position, the clutch 860 connects the first range member 870 to the clutch engagement member 865 such that the speed (i.e., rpm) provided by the second electric motor 815 is reduced through the second gear train 825, and the torque provided by the second electric motor 815 to the first output shaft 840 is increased through the second planetary gear 835. The second output shaft 845 of the second electric motor 815 has a second range member 875 where the clutch 860 engages when in a second range position. When in the second range position, the clutch 860 connects the second range member 875 to the clutch engagement member 865 such that the speed and torque of the second electric motor 815 is directly provided to the first output shaft 840 of the first electric motor 810. As compared to the first range position, the speed of the second electric motor 815 provided to the first output shaft 840 of the first electric motor 810 is faster, and the torque is less. The clutch 860 can further be positioned at a neutral position where the second electric motor 815 is not mechanically coupled to the first electric motor 810. In the neutral shift position, the first electric motor 810 can provide the sole mechanical power to propel the vehicle 100.

By using more than one electric motor, the powertrain system 105 is configured to allow smaller, consumer automotive electric motors to be used to power larger, commercial-grade vehicles such as those with a FHWA class rating of four (4) or higher and/or those that are able to move 40,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

Again, this multiple motor design also can use energy more efficiently. The power, speed, and/or torque provided by the first electric motor 810 and the second electric motor 815 can be adjusted so that the motors operate in a more efficient manner for differing operational conditions. For example, the clutch 860 can change the gear ratios of the second gear train 825 so as to adjust the output speed and/or torque provided by the second electric motor 815. The clutch 860 can further be used to disconnect the second electric motor 815 from the first electric motor 810 such that the first electric motor 810 provides all of the propulsive mechanical power to the drive shaft 125. At the same time, the second electric motor 815 can be shut down to conserve power and allow the first electric motor 810 operate within an efficient power band, or the speed of the second electric motor 815 can be changed for shifting purposes. Once more, with the first electric motor 810 permanently connected to the drive shaft 125 power can be always applied to the propulsion system 130 such that any shifting of the second gear train 825 via the clutch 860 can be imperceptible to the driver and/or passengers of the vehicle 100. Given the first electric motor 810 continuously provides power to the wheels 135, the powertrain system 105 can take the proper time during shifting so as to enhance efficiency and performance of the vehicle 100. The powertrain system 105 is able to provide more than adequate time to deal with timing and synchronization issues between the first electric motor 810, second electric motor 815, second gear train 825, and/or clutch 860.

Referring to FIG. 9, the first output shaft 840 is located concentric to and surrounded by the second output shaft 845. In another embodiment, the second output shaft 845 may be concentric to and surrounded by the first output shaft 840. This arrangement reduces the amount of space needed to house the electric powertrain 800. This reduction lightens the load and reduces the amount of gearing required. The reduction in weight and gearing in turn helps to increase electric motor efficiency. The first output shaft 840 and second output shaft 845 define a shaft clearance gap 905. The shaft clearance gap 905 generally runs the length of the first output shaft 840 and second output shaft 245 and provides space for the inner shaft to rotate freely. Furthermore, this cavity may be used to assist in shaft lubrication. For example, this recess may be filled with oil, grease, or any other lubricant. Additionally, this cavity may house bearings that would assist in keeping the shafts rotating smoothly with as little friction as possible.

Like in the earlier examples, the first output shaft 840 defines a first lubrication channel 910 with one or more lubricant supply openings 912 configured to supply lubrication to various components inside the electric powertrain 800. The first output shaft 840 further has an output alignment pin 915 and upstream alignment pin 920 located at opposing ends to align the first output shaft 840. The drive shaft 125 and first output shaft 840 are arranged in a longitudinal end-to-end arrangement. In the illustrated example, the first output shaft 840 includes a motor section 925 and a gear section 930 that are nested together in a longitudinal end-to-end configuration so as to facilitate assembly and repair of the electric powertrain 800. The end of the gear section 930 in the depicted example is nested inside the motor section 925, but in other examples, the end of the motor section 925 can be nested inside the gear section 930.

Figure 10:
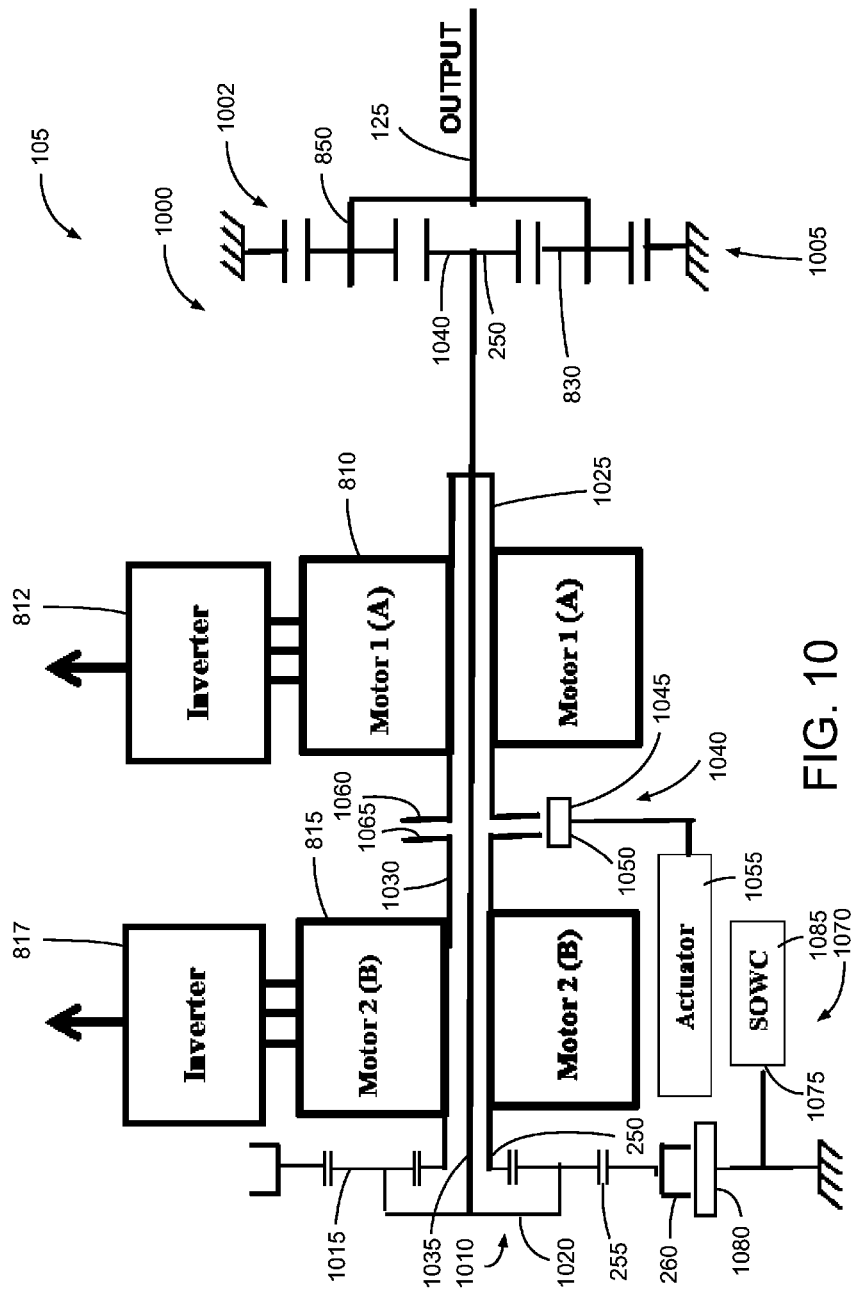
FIG. 10 is a diagrammatic view of yet another example of an electric powertrain that can be used in the vehicle of FIG. 1.
Figure 11:
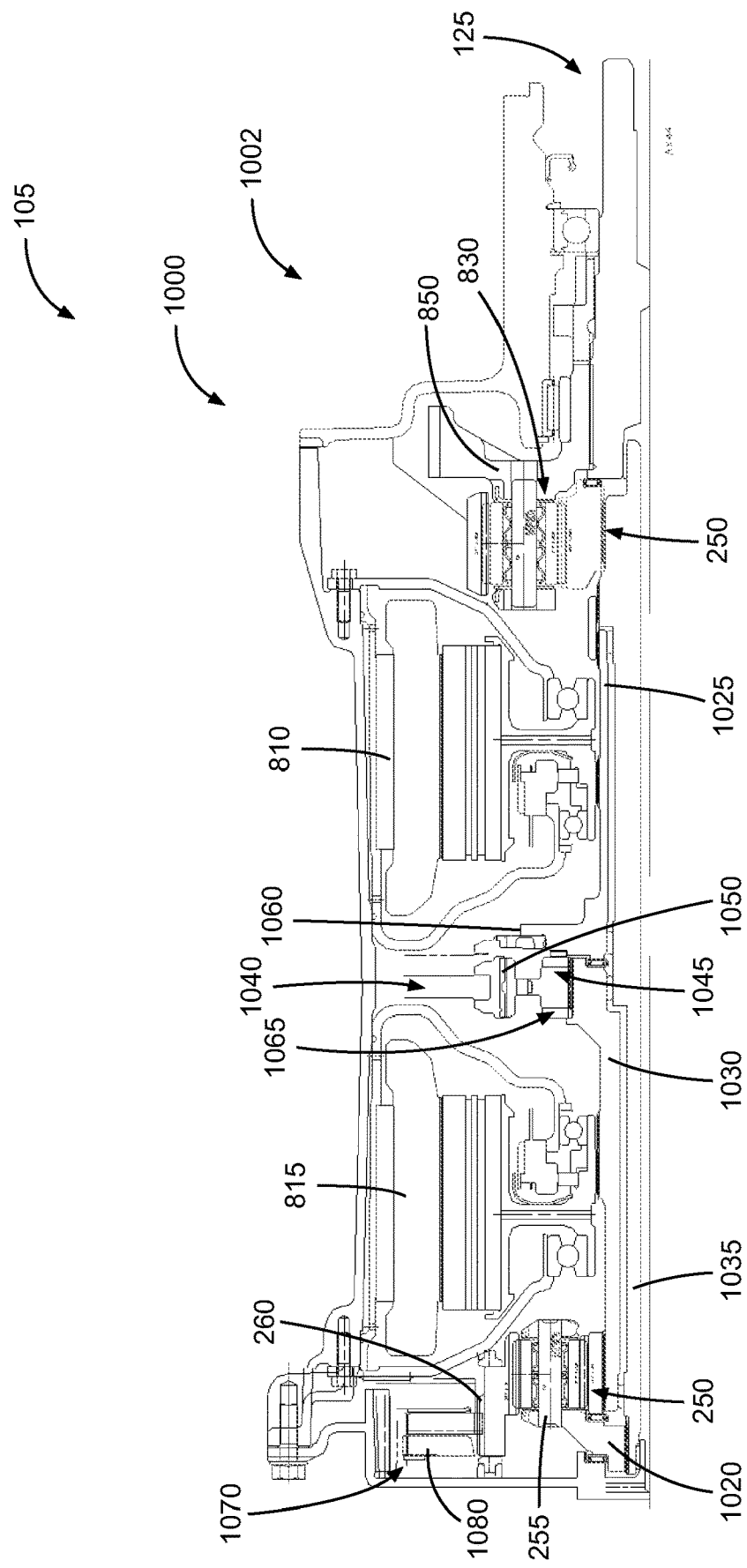
FIG. 11 is a cross-sectional view of the electric powertrain shown in FIG. 10.

FIG. 10 shows a diagram of another example of the electric powertrain 1000 that can be used in the powertrain system 105 of FIG. 1, and FIG. 11 shows a cross-sectional view of the electric powertrain 1000. The electric powertrain 1000 shares a number of components and functions in common with the ones described before (see e.g., FIGS. 2, 3, and 8). For the sake of brevity as well as clarity, these common features will not be described in great detail below, but please refer to the previous discussion.

As depicted, the electric powertrain 1000 includes a multiple motor continuous power transmission 1002. The transmission 1002 of the electric powertrain 1000 includes a first electric motor 810 with a first inverter 812 and a second electric motor 815 with a second inverter 817. The first inverter 812 is electrically connected between the ESS 115 and the first electric motor 810, and the second inverter 817 is electrically connected between the ESS 115 and the second electric motor 815. The first inverter 812 and second inverter 817 convert the direct current (DC) from the ESS 115 to alternating current (AC) in order to power the first electric motor 810 and second electric motor 815, respectively. The first electric motor 810 and second electric motor 815 can also act as generators such as during regenerative braking. In such a situation, the first inverter 812 and second inverter 817 convert the AC electrical power from the first electric motor 810 and second electric motor 815, respectively, to DC power that is supplied to the ESS 115. In one example, the first electric motor 810 and second electric motor 815 are the same type of electric motor such that both motors generally provide the same speed and torque output within normal manufacturing tolerances. The first electric motor 810 and second electric motor 815 in one form are both high speed electric motors, and in another form, the first electric motor 810 and second electric motor 815 are both low speed electric motors. In alternative variations, the first electric motor 810 and second electric motor 815 can be different such that one for example is a high speed motor and the other is a low speed motor.

As can be seen in FIGS. 10 and 11, the electric powertrain 1000 includes a first gear train 1005 and a second gear train 1010. The first gear train 1005 is located at the output end of the first gear train 1005 and is proximal to the drive shaft 125. The first gear train 1005 includes the first planetary gear 830 with the first carrier 850 of the type described before with respect to FIG. 8. Located opposite the first gear train 1005, on the other side of the drive shaft 125 is the second gear train 1010. The second gear train 1010 includes a second planetary gear 1015 with a second carrier 1020.

In the illustrated example, the transmission 1002 includes a first output shaft 1025, a second output shaft 1030, and a third output shaft 1035 that extend in a longitudinal direction in the electric powertrain 1000. The first output shaft 1025 and second output shaft 1030 are hollow so as to receive the third output shaft 1035. The third output shaft 1035 extends in a concentric manner inside the first output shaft 1025 and second output shaft 1030. The first electric motor 810 and second electric motor 815 in one example are respectively secured to the first output shaft 1025 and second output shaft 1030 via a spline type connection of the types described and illustrated before.

As shown, the first output shaft 1025 and third output shaft 1035 are directly connected to the sun gear 250 of the first planetary gear 830. The second output shaft 1030 has an interruptible connection with the first output shaft 1025 through a first clutch 1040 that selectively connects the second output shaft 1030 to the first output shaft 1025. To provide a compact design, the first clutch 1040 is located or sandwiched in between the first electric motor 810 and second electric motor 815. In the illustrated example, the first clutch 1040 includes a single position type dog clutch 1045, but other types of clutches can be used in other variations. The dog clutch 1045 includes a clutch collar 1050 and a clutch actuator 1055 that is configured to move the clutch collar 1050 in a longitudinal direction to engage and disengage the second output shaft 1030 from the first output shaft 1025. The clutch actuator 1055 of the first clutch 1040 is operatively connected to the controller 110 so that the controller 110 is able to control the first clutch 1040. In the depicted example, the first output shaft 1025 has a clutch engagement member 1060 and the second output shaft 1030 has a range member 1065, and the clutch collar 1050 of the dog clutch 1045 selectively engages and disengages the range member 1065 of the second output shaft 1030 from the clutch engagement member 1060 of the first output shaft 1025. In other words, the first output shaft 1025 and second output shaft 1030 form an interruptible split shaft design that can be selectively connected together so that the torque from the first electric motor 810 and second electric motor 815 can be combined together.

At the end opposite the range member 1065, the second output shaft 1030 is connected to the second planetary gear 1015. Like in the other examples, the second planetary gear 1015 includes the sun gear 250, one or more sun gear 250 and the planet gears 255 generally arranged in a concentric manner relative to one another. The second output shaft 1030 in the depicted example is connected to the second planetary gear 1015 at the sun gear 250. The second electric motor 815 is in turn connected to the third output shaft 1035 through the second carrier 1020. Through the second carrier 1020, the second electric motor 815 is able to provide torque to the first output shaft 1025 which in turn is provided to the sun gear 250 of the first planetary gear 830.

The transmission 1002 further includes a second clutch 1070 that engages the second planetary gear 1015. In the illustrated example, the second clutch 1070 includes a Selectable One-Way Clutch ("SOWC") 1075. The SOWC 1075 includes a clutch engagement member 1080 configured to engage the ring gear 260 of the second planetary gear 1015 and a clutch actuator 1085 that selectively engages the clutch engagement member 1080 with the ring gear 260 to change the gear ratio for the power supplied by the second electric motor 815. The clutch actuator 1085 of the SOWC 1075 is operatively connected to the controller 110 so that the controller 110 is able to control the second clutch 1070. By controlling the operation of the first clutch 1040 and second clutch 1070, the controller 110 is able to change and control the speed and torque supplied by the second electric motor 815 to first gear train 1005.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, and rim clutches, to name just a few.

"Cogwheel", "Cog", or "Pinion" generally refers to a relatively small gear in a gear drive train. The cogwheel usually include a series of teeth that engage corresponding teeth on a rack or other teethed structure. Typically, but not always, the smaller cogwheel engages or is engaged inside a larger gear or to a rack. When engaging a rack, rotational motion applied to the cogwheel causes the rack to move relative to the cogwheel, thereby translating the rotational motion of the cogwheel into linear motion. By way of non-limiting examples, the cogwheel can be incorporated into differential, rack-and-pinion, and clutch bell drive trains, to name just a few. The cogwheel can be oriented in a number of manners relative to the larger gear or rack. For instance, the cogwheel can be angled perpendicular to a crown gear in a differential type drive.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Couple" or "Coupled" generally refers to an indirect and/or direct connection between the identified elements, components, and/or objects. Often the manner of the coupling will be related specifically to the manner in which the two coupled elements interact.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Eccentric" generally refers to having an axis located elsewhere than at the geometric center of an object or relative an axis of another object. As one non-limiting example, when oriented in an eccentric manner, the object has an axis of revolution displaced from the center of the object (or relative to another object) so that the object is capable of imparting reciprocating motion. In other words, something is considered eccentric when it is not placed centrally or does not have its axis or other part placed centrally.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Electronic Control Unit (ECU)" or "Electronic Control Module (ECM)" generally refers to an embedded system in electronics of a vehicle that controls one or more electrical systems and/or subsystems of the vehicle. Usually, but not always, ECUs communicate over a Controller Area Network (CAN) and can act as nodes over the CAN. The complexity of the ECU or node can range from a simple Input/Output (I/O) device up to an embedded computer with a CAN interface and software. The ECU or node can also act as a gateway allowing a general purpose to computer to communicate over an interface, such as via a USB and/or Ethernet port, to the devices on the CAN network. Each ECU usually, but not always, includes a central processing unit, a CAN controller, and a transceiver. These ECUs can for instance include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/ electric recharging systems, to name just a few. By way of nonlimiting examples, types of ECUs can include ECMs, TCMs, Powertrain Control Module (PCMs), Brake Control Modules (BCMs or EBCMs), Central Control Modules (CCMs), Central Timing Modules (CTMs), General Electronic Modules (GEMs), Body Control Modules (BCMs), and/or Suspension Control Modules (SCMs), to name just a few.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/ or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Flat" generally refers to a smooth and even surface without marked lumps and/or indentations.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"Gearbox" or "Transmission" generally refer to a power system that provides controlled application of mechanical power. The gearbox uses gears and/or gear trains to provide speed, direction, and/or torque conversions from a rotating power source to another device.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Lateral" generally refers to being situated on, directed toward, or coming from the side. "Longitudinal" generally relates to length or lengthwise dimension of an object, rather than across.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Positive Clutch" generally refers to a type of clutch that is designed to transmit torque without slippage such as through a mechanical interference type connection. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Selectable One-Way Clutch" (SOWC) generally refers to a type of clutch that is able to be controlled to lock in at least one rotational direction. One-way clutches are usually (but not always) designed to transfer torque or lock when rotated in one direction and to allow rotational movement or freewheel when rotated in the opposite direction. The SOWC is a type of one-way clutch that can be used to control when and/or in which direction the rotational motion is locked or able to rotate freely. By way of a non-limiting example, the SOWC can be activated to lock so as to transfer torque when torque is applied in one rotational direction and facilitate free-wheel or slipping movement in the opposite rotational direction. In other variations, the SOWC can be controlled at times to facilitate free-wheel motion in both rotational directions or locked to allow torque transfer in both rotational directions. Alternatively or additionally, the SOWC can be controlled to switch or change the locked and freewheel rotational directions. For example, the SOWC under one operating condition can be locked when rotated in a counterclockwise and free-wheel spin in the clockwise direction, and under other conditions, the SOWC can be switched so that the SOWC is locked in the clockwise direction and freewheel spin in the counterclockwise direction. Some non-limiting examples of SOWC designs include roller, sprag, spiral, and mechanical diode type designs. The SOWC can be controlled or actuated in a number of ways such as through mechanical and/or electrical actuation. For instance, the SOWC can be actuated with hydraulic, pneumatic, and/or electrical type actuators to name just a few.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refers to a property of something having two sides or halves that are the same relative to one another, such as in shape, size, and/or style. In other words, symmetric describes something as having a mirror-image quality.

"Transmission" generally refers to a power system that provides controlled application of mechanical power. The transmission uses gears and/or gear trains to provide speed, direction, and/or torque conversions from a rotating power source to another device.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Uninterrupted Connection" generally refers to a mechanical linkage between two mechanical components without any break in continuity such that mechanical force can be transmitted on a continuous basis if so desired. The uninterrupted connection does not require a unitary connection such that the uninterrupted connection can include multiple components such as multiple shafts and gears that engage with one another. The uninterrupted connection lacks mechanisms or other structures, such as clutches, that are designed to disconnect and reconnect the mechanical linkage between the components during normal operation. It should be recognized that the uninterrupted connection can occasionally have accidental breakages that disconnect the components, but the design of the uninterrupted connection is not designed to facilitate such breakages and resulting disconnections.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

The term "or" is inclusive, meaning "and/or".

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | vehicle |
| 105 | powertrain system |
| 110 | controller |
| 115 | ESS |
| 120 | CAN |
| 125 | drive shaft |
| 130 | propulsion system |
| 135 | wheels |
| 140 | power cables |
| 200 | electric powertrain |
| 205 | transmission |
| 210 | first electric motor |
| 215 | second electric motor |
| 220 | first gear train |
| 225 | second gear train |
| 230 | first planetary gear |
| 235 | second planetary gear |
| 240 | first output shaft |
| 245 | second output shaft |
| 250 | sun gear |
| 255 | planet gears |
| 260 | ring gear |
| 265 | housing |
| 270 | first carrier |
| 275 | second carrier |
| 280 | clutch |
| 285 | clutch engagement member |
| 290 | first range member |
| 295 | second range member |
| 300 | electric motor transmission |
| 305 | longitudinal axis |
| 310 | rotor |
| 315 | stator |
| 320 | positive clutch |
| 325 | dog clutch |
| 330 | clutch actuator |
| 400 | shaft assembly |
| 405 | clutch collar |
| 410 | shaft alignment pin |

| Reference Numbers | |
|---|---|
| 412 | output alignment pin |
| 413 | first shaft body |
| 414 | clutch engagement member splines |
| 415 | first sun gear teeth |
| 417 | first motor engagement splines |
| 420 | alignment pin cavity |
| 422 | upstream alignment pin |
| 423 | second shaft body |
| 425 | second sun gear teeth |
| 427 | second motor engagement splines |
| 428 | second range member teeth |
| 430 | alignment pin lip |
| 435 | first shaft opening |
| 440 | first shaft engagement splines |
| 445 | collar engagement teeth |
| 447 | collar cavity |
| 450 | collar teeth |
| 455 | shifting teeth |
| 505 | double arrow |
| 510 | first lubrication channel |
| 515 | second lubrication channel |
| 520 | lubricant supply openings |
| 605 | output opening |
| 610 | output shaft coupling |
| 705 | shaft alignment collar |
| 710 | end cap |
| 800 | electric powertrain |
| 805 | transmission |
| 810 | first electric motor |
| 812 | first inverter |
| 815 | second electric motor |
| 817 | second inverter |
| 820 | first gear train |
| 825 | second gear train |
| 830 | first planetary gear |
| 835 | second planetary gear |
| 840 | first output shaft |
| 845 | second output shaft |
| 850 | first carrier |
| 855 | second carrier |
| 860 | clutch |
| 862 | clutch actuator |
| 865 | clutch engagement member |
| 870 | first range member |
| 875 | second range member |
| 905 | shaft clearance gap |
| 910 | first lubrication channel |
| 912 | lubricant supply openings |
| 915 | output alignment pin |
| 920 | upstream alignment pin |
| 925 | motor section |
| 930 | gear section |
| 1000 | electric powertrain |
| 1002 | transmission |
| 1005 | first gear train |
| 1010 | second gear train |
| 1015 | second planetary gear |
| 1020 | second carrier |
| 1025 | first output shaft |
| 1030 | second output shaft |
| 1035 | third output shaft |
| 1040 | first clutch |
| 1045 | dog clutch |
| 1050 | clutch collar |
| 1055 | clutch actuator |
| 1060 | clutch engagement member |
| 1065 | range member |
| 1070 | second clutch |
| 1075 | SOWC |
| 1080 | clutch engagement member |
| 1085 | clutch actuator |

What is claimed is:

1. A powertrain system, comprising:
a first electric motor with an uninterrupted connection to an output and a second electric motor with an interruptible connection to the output;

wherein the first electric motor has a first output shaft and the second electric motor has a second output shaft axially aligned along a longitudinal axis;
wherein the first output shaft and the second output shaft are coupled in an end-to-end engagement,
wherein the uninterrupted connection includes a mechanical linkage that lacks a break in continuity;
wherein the interruptible connection includes a clutch;
a planetary gear coupled to the second electric motor;
wherein the clutch is moveable between at least a first range position and a second range position;
wherein the clutch at the first position engages the planetary gear to increase torque from the second electric motor; and
wherein the clutch at the second range position engages the planetary gear to reduce torque from the second electric motor.

2. The powertrain system of claim 1, wherein the first and second electric motors rotate about a common axis of rotation.

3. The powertrain system of claim 2, wherein the axis of rotation of the second electric motor is aligned with the axis of rotation for a driveshaft of the output.

4. The powertrain system of claim 1, wherein the first output shaft has a shaft alignment pin received inside the second output shaft.

5. The powertrain system of claim 4, further comprising:
a clutch collar surrounding the end-to-end engagement of the first output shaft and the second output shaft to form a nested arrangement.

6. The powertrain system of claim 5, wherein the second output shaft has a range member received inside the clutch collar.

7. The powertrain system of claim 6, wherein the clutch collar is configured to draw the range member towards the first output shaft during shifting.

8. The powertrain system of claim 6, further comprising:
a clutch engagement member coupling the clutch collar to the first output shaft.

9. The powertrain system of claim 1, wherein the first output shaft has a first lubrication channel and the second output shaft has a second lubrication channel fluidly coupled to the first lubrication channel.

10. The powertrain system of claim 9, wherein the first output shaft defines a lubricant supply opening that extends from the first lubrication channel to an exterior of the first output shaft.

11. The powertrain system of claim 1, wherein the first output shaft has alignment pins at opposing ends.

12. The powertrain system of claim 1, wherein the second output shaft has an alignment pin at one end and an alignment pin cavity at the opposite end.

13. The powertrain system of claim 12, wherein the alignment pin cavity is surrounded by a range member with one or more range member teeth.

14. The powertrain system of claim 1, further comprising:
a first planetary gear coupled to the first output shaft and a second planetary gear coupled to the second output shaft.

15. The powertrain system of claim 14, wherein the first output shaft has first sun gear teeth forming part of the first planetary gear and the second output shaft has second sun gear teeth forming part of the second planetary gear.

16. The powertrain system of claim 1, wherein:
the power is supplied to the output solely through the first and second electric motors;
the output is configured to move a 40,000 pound or more vehicle; and
the first and second electric motors are high speed motors with a rated operating speed of at least 5,000 rpm.

17. The powertrain system of claim 1, further comprising:
a clutch collar surrounding the end-to-end engagement of the first output shaft and the second output shaft to form a nested arrangement;
wherein the planetary gear has a first range member;
wherein the first range member is received in the clutch collar;
wherein the second output shaft has a second range member received inside the clutch collar;
wherein the clutch collar is moveable between a first range position, a second range position, and a neutral position;
wherein the clutch collar at the first range position engages the first range member to increase torque from the second electric motor;
wherein the clutch collar at the second range position engages the second range member to reduce torque from the second electric motor;
wherein the clutch collar at the neutral position does not engage the first range member and the second range member; and
wherein the clutch collar is configured to draw the range member towards the first output shaft during shifting.

18. The powertrain system of claim 1, further comprising:
a clutch collar surrounding the end-to-end engagement of the first output shaft and the second output shaft to form a nested arrangement;
wherein the planetary gear includes a sun gear, a ring gear, and one or more planet gears engaged between the sun gear and the ring gear;
wherein the clutch collar at the first range position connects to the planet gears to increase torque from the second electric motor; and
wherein the clutch collar at the second range position connects to the sun gear to reduce torque from the second electric motor.

19. The powertrain system of claim 1, further comprising:
wherein the first output shaft has a clutch engagement member;
a clutch collar engaging the clutch engagement member;
wherein the clutch collar surrounds the clutch engagement member;
a planetary gear coupled to the second output shaft;
wherein the planetary gear includes a sun gear, a ring gear, and one or more planet gears engaged between the sun gear and the ring gear;
a first range member connected to the planet gears;
wherein the first range member is received in the clutch collar;
a second range member connected to the sun gear;
wherein the second output shaft has the second range member;
wherein the second output shaft connects the second range member to the sun gear;
wherein the second range member is received in the clutch collar;
wherein the clutch collar at the first range position engages the first range member to increase torque from the second electric motor;
wherein the clutch collar at the second range position engages the second range member to reduce torque from the second electric motor;

wherein the clutch is moveable to a neutral position where the clutch mechanically disconnects the second electric motor from the first electric motor; and wherein the clutch collar at the neutral position does not engage the first range member and the second range member.

20. A powertrain system, comprising:

a first electric motor with an uninterrupted connection to an output and a second electric motor with an interruptible connection to the output;

wherein the first and second electric motors rotate about a common axis of rotation;

wherein the first electric motor has a first output shaft that is enclosed by a second output shaft of the second electric motor;

wherein the uninterrupted connection includes a mechanical linkage that lacks a break in continuity; and wherein the first and second electric motors are high speed motors with a rated operating speed of at least 5,000 rpm.

21. The powertrain system of claim 20, wherein the axis of rotation of the second electric motor is aligned with the axis of rotation for a driveshaft of the output.

22. The powertrain system of claim 20, wherein the first electric motor and the second electric motor are selectively coupled through a split shaft that has a clutch located between the motors.

23. A powertrain system, comprising:

a first electric motor with an uninterrupted connection to an output and a second electric motor with an interruptible connection to the output;

wherein the first and second electric motors rotate about a common axis of rotation;

wherein the axis of rotation of the second electric motor is aligned with the axis of rotation for a driveshaft of the output;

wherein the first electric motor has a first output shaft that encloses a second output shaft of the second electric motor;

wherein the uninterrupted connection includes a mechanical linkage that lacks a break in continuity;

wherein the interruptible connection includes a clutch; and wherein the first and second electric motors are high speed motors with a rated operating speed of at least 5,000 rpm.

24. The powertrain system of claim 23, wherein the first electric motor and the second electric motor are selectively coupled through a split shaft that has a clutch located between the motors.

* * * * *